United States Patent
Feng

(10) Patent No.: US 12,427,948 B2
(45) Date of Patent: Sep. 30, 2025

(54) IN-VEHICLE DISPLAY OF IDENTIFICATION IN A SUSPECTED STOLEN VEHICLE

(71) Applicant: FCA US LLC, Auburn Hills, MI (US)

(72) Inventor: Xin Feng, Canton, MI (US)

(73) Assignee: FCA US LLC, Auburn Hills, MI (US)

( * ) Notice: Subject to any disclaimer, the term of this patent is extended or adjusted under 35 U.S.C. 154(b) by 22 days.

(21) Appl. No.: 18/475,283

(22) Filed: Sep. 27, 2023

(65) Prior Publication Data

US 2025/0100507 A1 Mar. 27, 2025

(51) Int. Cl.
*B60R 25/104* (2013.01)

(52) U.S. Cl.
CPC .................. *B60R 25/104* (2013.01)

(58) Field of Classification Search
CPC .............................. B60R 25/104; B60R 25/33
See application file for complete search history.

(56) References Cited

U.S. PATENT DOCUMENTS

| | | | | |
|---|---|---|---|---|
| 5,668,416 A * | 9/1997 | Watanabe | ............... | B60R 25/04 180/287 |
| 5,900,823 A * | 5/1999 | Coll-Cuchi | ............. | B60R 25/04 340/5.32 |
| 7,224,276 B2 * | 5/2007 | Matsudaira | ............... | G08B 1/08 367/199 |
| 7,286,045 B2 * | 10/2007 | Oesterling | ............... | B60R 25/33 340/426.22 |
| 7,584,366 B2 * | 9/2009 | Aaron | ................... | G06F 21/577 713/189 |
| 11,360,486 B2 * | 6/2022 | Perez Barrera | ....... | H04W 4/024 |
| 11,436,369 B1 * | 9/2022 | Mousseau | ............... | G06F 21/32 |
| 11,968,205 B1 * | 4/2024 | Mousseau | ............... | G16H 20/17 |
| 2002/0036566 A1 * | 3/2002 | Isobe | ....................... | B60R 25/33 340/426.11 |
| 2004/0135680 A1 * | 7/2004 | Jacobs | ..................... | B60R 25/21 340/426.12 |
| 2005/0146422 A1 * | 7/2005 | Ando | .................. | B60R 25/1004 340/988 |
| 2005/0242929 A1 * | 11/2005 | Onishi | ..................... | B60R 25/04 340/432 |
| 2006/0163947 A1 * | 7/2006 | Onishi | ..................... | B60R 25/02 340/426.11 |
| 2008/0048847 A1 * | 2/2008 | Shimomura | ........ | B60C 23/0408 340/426.33 |
| 2008/0293391 A1 * | 11/2008 | Shinoda | ............... | G08B 25/007 455/414.1 |
| 2008/0294452 A1 * | 11/2008 | Hunt | ....................... | G07F 15/00 705/412 |

(Continued)

*Primary Examiner* — Hoi C Lau
(74) *Attorney, Agent, or Firm* — Jeremy J. Klobucar

(57) ABSTRACT

A method of communicating vehicle identification information in a suspected stolen vehicle includes the steps of determining an occurrence of a stolen vehicle event and providing a notification in the vehicle that includes at least one vehicle identifier. The occurrence of a stolen vehicle event may be determined by the vehicle being reported as stolen or if the vehicle loses connection to the network for a predetermined amount of time. If a stolen vehicle event has occurred, a notification is made in the vehicle. The notification may be a vehicle identifier communicated to a user of a vehicle through a display, speaker, or other mode of communication to identify a potentially stolen vehicle.

16 Claims, 2 Drawing Sheets

(56) References Cited

U.S. PATENT DOCUMENTS

| | | | | |
|---|---|---|---|---|
| 2011/0241854 A1* | 10/2011 | Matsui | ................ | H04W 52/283 |
| | | | | 340/436 |
| 2012/0046807 A1* | 2/2012 | Ruther | .................... | B60R 25/24 |
| | | | | 701/2 |
| 2013/0154833 A1* | 6/2013 | Kiss | ........................ | H04Q 9/00 |
| | | | | 340/545.1 |
| 2013/0207795 A1* | 8/2013 | Gau | ........................ | B60R 16/02 |
| | | | | 340/426.11 |
| 2014/0267712 A1* | 9/2014 | Foerster | ........... | G08B 13/19695 |
| | | | | 340/568.3 |
| 2014/0376778 A1* | 12/2014 | Muetzel | ................ | B60R 25/305 |
| | | | | 382/105 |
| 2016/0343224 A1* | 11/2016 | Markwell | ................ | H04W 4/02 |
| 2017/0015277 A1* | 1/2017 | Lisi | ........................ | B60R 25/33 |
| 2017/0134898 A1* | 5/2017 | Vega | ..................... | H04W 12/30 |
| 2018/0136657 A1* | 5/2018 | Mattingly | .............. | G06Q 10/08 |
| 2018/0141603 A1* | 5/2018 | Byun | .................... | B62H 5/003 |
| 2019/0278296 A1* | 9/2019 | Perez Barrera | ...... | G05D 1/0212 |
| 2019/0359172 A1* | 11/2019 | Galicia Rodríguez | ...................... | |
| | | | | G08B 13/00 |
| 2020/0043311 A1* | 2/2020 | Choe | ................. | H04W 52/0212 |
| 2020/0371190 A1* | 11/2020 | Sejimo | ................ | H04W 64/003 |
| 2025/0100507 A1* | 3/2025 | Feng | .................... | B60R 25/104 |

\* cited by examiner

IN-VEHICLE DISPLAY OF IDENTIFICATION IN A SUSPECTED STOLEN VEHICLE

FIELD

The present disclosure relates to a method of communicating vehicle identification information in a suspected stolen vehicle.

BACKGROUND

A vehicle identification number (VIN) is used to identify a vehicle. The VIN is commonly located under the windshield on the drivers' side of a vehicle or on various other components vehicle. This allows tampering of the VIN such that a stolen vehicle could be misrepresented as a clean-titled vehicle on the secondary market. Further, if a VIN is tampered with, it can be difficult to prove that an alleged thief knew they were operating or in possession of a stolen vehicle.

SUMMARY

In at least some implementations, a method of displaying vehicle identification information in a suspected stolen vehicle, includes determining either that: 1) a frontend of a network has not been connected to a backend of the network for a predetermined amount of time; or 2) the vehicle has been reported as stolen, and displaying a notification on a display within the vehicle, wherein the notification includes at least a vehicle identifier.

In at least some implementations, the frontend of the network repeatedly attempts to connect to the backend of the network at a predetermined time interval. In at least some implementations, if the frontend of the network has not been connected to the backend of the network for the predetermined amount of time and thereafter the frontend of the network connects to the backend of the network, the backend of the network communicates to the frontend of the network whether the vehicle has been reported as stolen. In at least some implementations, if the vehicle has not been reported as stolen, displaying of the notification is terminated.

In at least some implementations, the vehicle identifier includes at least a vehicle identification number.

In at least some implementations, if the vehicle has been reported as stolen and the notification has been displayed, but the vehicle is subsequently reported by the backend of the network or the frontend of the network as not stolen, displaying of the notification is terminated.

In at least some implementations, the frontend of the network is communicated with the backend of the network via a cellular communication network.

In at least some implementations, the vehicle identifier includes at least one of a vehicle identification number, a make of the vehicle, a model of the vehicle, a year of manufacture of the vehicle and a color of the vehicle.

In at least some implementations, the notification is stored in memory of the vehicle and the notification is displayed when the frontend of the network has not been connected to the backend of the network for a predetermined amount of time.

In at least some implementations, the notification is transmitted from the backend of the network to the frontend of the network after the vehicle has been reported as stolen.

In at least some implementations, a method of communicating vehicle identification information in a suspected stolen vehicle, includes determining an occurrence of a stolen vehicle event and providing a notification in the vehicle, wherein the notification includes at least one vehicle identifier.

In at least some implementations, the step of determining an occurrence of a stolen vehicle event includes determining if a frontend of a network is connected to a backend of a network. In at least some implementations, determining if the frontend of the network is connected to the backend of the network includes determining if the frontend of the network has not been connected to the backend of the network for a predetermined amount of time, and if the frontend of the network has not connected to the backend of the network for the predetermined amount of time, then it is determined that a stolen vehicle event has occurred.

In at least some implementations, the step of determining an occurrence of a stolen vehicle event is accomplished by the frontend of the network receiving a communication from the backend of the network.

In at least some implementations, if the frontend of the network is connected to the backend of the network and the backend of the network does not indicate that a stolen vehicle event has occurred, a notification is not provided in the vehicle.

In at least some implementations, the notification is provided on a display that is visible from at least an interior of the vehicle. In at least some implementations, the notification provided in the vehicle includes a communication that a stolen vehicle event has occurred.

In at least some implementations, if a stolen vehicle event has occurred and the notification has been provided, but the vehicle is subsequently reported by the backend of the network or the frontend of the network as not stolen, the notification is removed.

In at least some implementations, the notification is provided in the vehicle in an obvious and conspicuous manner so that the notification is readily seen by a thief or a prospective purchaser of the vehicle. In at least some implementations, the intent is not to hide the notification from a thief but to deter a thief from stealing the vehicle in the first place if/when thieves learn of the capability of the vehicle to provide the notification, and the ease with which prospective purchasers can be alerted to and informed that the vehicle status is currently listed as being stolen. Thus, even if a thief tampers with the vehicle identification number, the notification provided digitally on a display, from a backend network not accessible to the thief, or from secure memory in the vehicle that is beyond the capability of most vehicle thieves to tamper with, will enable a prospective purchaser to learn the status of the vehicle and thereby inhibit sales of stolen vehicles.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Referring in more detail to the drawings, systems and methods of displaying vehicle identification information in a suspected stolen vehicle are shown and described. During the process of manufacturing a vehicle, a unique vehicle identifier, known as the vehicle identification number (VIN), is provided on each vehicle. The VIN may include letters and numbers and may be used to identify a vehicle, and may be associated with vehicle information such as a vehicle's manufacturer, vehicle model, options, or powertrain configuration. To deter theft and facilitate identification of a vehicle, a vehicle's VIN may be provided in several locations on the vehicle.

Figure 1:
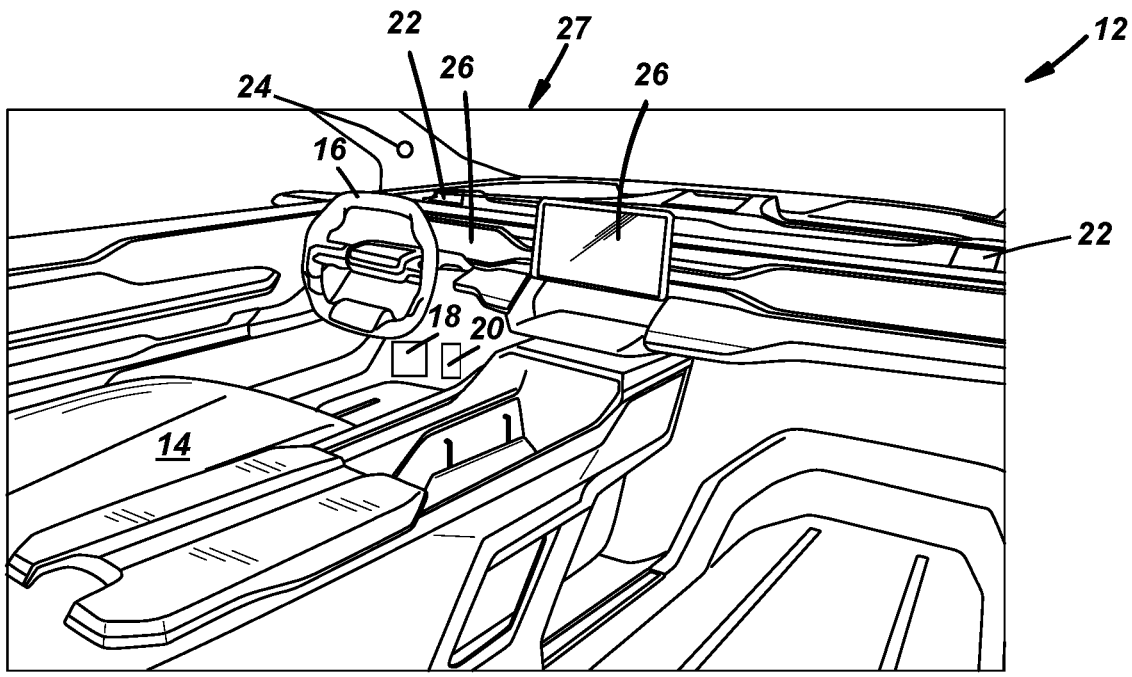
FIG. 1 is a perspective view of part of a vehicle interior showing displays configured to show text or images.

FIG. 1 shows part of an interior of the vehicle 12 including part of the passenger compartment which includes one or more seats 14 or seating areas, and one or more vehicle controls, such as a steering wheel 16, brake pedal 18 and accelerator pedal 20. Further, an infotainment system including audio and visual devices, like speakers 22, microphones 24 and one or more display screens 26, may be accessible from within the passenger compartment. Music, images and messages/information may be provided to an occupant of the vehicle via the infotainment system.

The vehicle includes one or more indicators 27 by which information can be provided to a vehicle occupant. In at least some implementations, one or more display screens 26 in the vehicle and/or one or more audio outputs, like speakers 22, may be collectively called indicators 27 by which a message or notification can be provided to an occupant of the vehicle, like a pop-up message that overlies other content and which cannot be removed from the display until the vehicle status is reset, as set forth in more detail below. As also described herein, the indicators 27 may be used to notify an occupant of the vehicle that the vehicle was reported as having been stolen, or certain conditions have been met by which the system has determined that the vehicle might have been stolen. The notification may remain until the system is reset by the owner of the vehicle or authorized person/entity. In this way, the system may inhibit theft of the vehicle, and/or limit or inhibit sale of the vehicle after it has been stolen.

Figure 2:
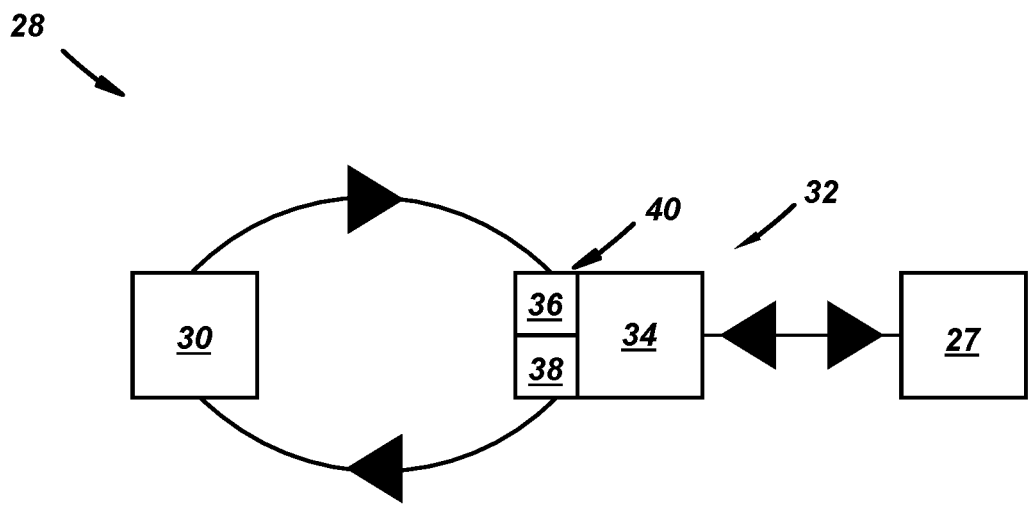
FIG. 2 is a diagrammatic view of a system for displaying vehicle identification information in a suspected stolen vehicle.

As shown in FIG. 2, a network 28 may be configured to store, transmit to, or receive a vehicle status from a vehicle. According to one non-limiting example, the network 28 may include a backend portion 30 and a frontend portion 32 that may be defined by components in the vehicle and which may be distributed across a fleet of vehicles. In at least some implementations, the backend portion 30 of the network 28 may be a remote server separate from the vehicle. In at least some implementations, the frontend 32 of the network 28 is located within the vehicle. The network 28 may include a cellular-based network, a satellite-based network, a city-wide WiFi-based network, some other type of communications network and/or a combination thereof to facilitate communication between the backend 30 and frontend 32.

The backend portion 30 may include any suitable combination of software and/or hardware resources typically found in a backend of a cloud-based network. For example, the backend portion 30 may receive and store a vehicle status (e.g. connected to the network, not connected to the network, reported or suspected as stolen, as set forth in more detail below) from a vehicle or from other data sources (e.g., police reports, vehicle owner reports, vehicle manufacturer's database, etc.). The backend portion 30 may be managed or controlled by the vehicle manufacturer or other entity, like a law enforcement agency, and can be part of a larger cloud-based system that the vehicle manufacturer uses to communicate and interact with one or more vehicles for a multitude of purposes.

The backend portion 30 may include any suitable combination of software and/or hardware resources including, but not limited to, components, devices, computers, modules and/or systems such as those directed to applications, service, storage, management and/or security (each of these resources is referred to herein as a "backend resource," which broadly includes any such resource located at the backend portion). In one example, the backend portion 30 has a number of backend resources including data storage systems, servers, networks, programs and algorithms, as well as other suitable backend resources. It should be appreciated that backend portion 30 is not limited to any particular architecture, infrastructure or combination of elements, and that any suitable backend arrangement may be employed.

The frontend portion 32 may include any suitable combination of software and/or hardware resources typically found in a frontend of a cloud-based system, and is generally responsible for receiving or transmitting a vehicle status to or from the backend portion 30 and for conveying information to a user of a vehicle through one or more indicators which may be part of a vehicle infotainment system. The frontend portion 32 is typically responsible for running the applications that interface with the users in vehicles, and for interfacing with the programs and algorithms of the backend portion 30. The frontend portion 32 may also be managed or controlled by the vehicle manufacturer and can be part of a larger cloud-based system that the vehicle manufacturer uses to communicate and interact with one or more vehicles.

The frontend portion 32 may be distributed across one or more vehicles and may include any suitable combination of software and/or hardware resources including, but not limited to, components, devices, computers, modules and/or systems. In one example, the frontend portion 32 has a number of frontend resources including one or more control system(s) 34 installed in the vehicle, where each control system 34 may include some combination of a processor, receiver 36, transmitter 38, and/or a data storage device. It is not necessary for the preceding units to be packaged in a single vehicle electronic module, rather, they could be distributed among multiple vehicle electronic modules, they could be stand-alone units, they could be combined or integrated with other units or devices, or they could be provided according to some other configuration. It should be appreciated that frontend portion 32 is not limited to any particular architecture, infrastructure or combination of elements, and that any suitable frontend arrangement may be employed.

As shown in FIG. 2, the frontend portion 32 of the network 28 may include, among other things, a vehicle communication device 40 by which information is received by and transmitted from the vehicle, a vehicle control system 34 and the vehicle indicators 27. In the example shown, the vehicle control system 34 is communicated with a receiver 36 and transmitter 38 of the vehicle communication device 40 and with the vehicle indicators 27. To communicate with the vehicle occupant, the frontend portion 32 of the network 28, including the vehicle control system 34, may communicate with the indicators 27 and be used to display text or images on the display(s) 26 or provide audio messages via the speakers 22, for example. The information may relate to the status of the vehicle and be indicative of whether a stolen vehicle event has occurred.

A stolen vehicle event may be any event or instance where the vehicle is suspected as being stolen or is determined to be stolen based on certain criteria or threshold(s). A stolen vehicle event may include a report made by the owner that the vehicle has been stolen, a predetermined amount of time elapsing since the vehicle communication device was last connected to the network (e.g. to the backend of the network), or other events, such as the filing of a police report. In at least some implementations, the vehicle may be reported as stolen such as by calling or sending a notice to a receiver/recipient of or associated with the backend portion 30 (e.g. a call center or the like), or by make a report to a law enforcement agency that communicates with the backend portion 30. Furthermore, the vehicle status may be stored in the backend portion 30 of the network 28 such that if the vehicle is reported stolen after connection between the vehicle communication device 40 and the backend portion 30 is lost, once connection of the vehicle/frontend portion 32 to the backend portion 30 is restored, a signal will be sent to the vehicle conveying the vehicle's status.

In at least some implementations, the vehicle may change its own vehicle status and provide the vehicle status via one or more of the indicators 27 without connection with the backend portion 30. For example, if the vehicle communication device 40 loses connection to the backend portion 30 and a predetermined, threshold amount of time elapses, the vehicle may change its own status to reflect that a stolen vehicle event has occurred and may provide that notification to the indicator(s) 27 without communication from the backend portion 30. The vehicle identifier(s) provided to the indicator(s) 27 may be stored in secure memory within the vehicle that inhibits an average vehicle thief from being able to manipulate the stored information. In this way, a stolen vehicle event can be indicated within the vehicle even if a thief tampers with the control system 34 or communication device 40 (e.g. an antenna of the receiver 36) to disconnect the vehicle from the backend portion 30.

Furthermore, the vehicle may communicate its status to the backend portion 30 if/when a connection with the backend portion 30 is established. If the vehicle identifier information that is stored in memory of the vehicle has been altered, then a stolen vehicle notification can be provided when connection with the backend 30 is restored and the system determines that the in-vehicle stored vehicle identifier information does not match that of the backend 30 of the network 28, or a person can get the information directly from the backend 30 of the network 28 and compare the information for themselves before purchasing the vehicle to avoid buying a stolen vehicle.

In at least some implementations, the backend portion 30 may be capable of overriding the vehicle status reported by the frontend portion 32 (e.g. the vehicle communication device 40) such that the frontend portion 32 accepts the vehicle status reported by the backend portion 30. For example, if the frontend portion 32 determines that a stolen vehicle event has occurred, but the backend portion 30 communicates to the frontend portion 32 that a stolen vehicle event has not occurred, the vehicle status may be returned to normal to match the vehicle status communicated by the backend portion 30.

In at least some implementations, if it is determined that a stolen vehicle event has occurred, one or more of the displays 26 may be used to communicate at least a vehicle identifier within the vehicle. The vehicle identifier may include the VIN or other information such as the make, model and color of the vehicle, and a notification of the vehicle status. Furthermore, in at least some implementations, the display(s) may show whether the vehicle communication device 40 is connected to the backend portion 30 of the network 32. In at least some implementations, multiple displays 26 that are visible from the vehicle interior 12 may be present. Each of the displays 26 individually or any combination of the displays 26 may be used to communicate at least the vehicle identifier(s) within the vehicle if it is determined that a stolen vehicle event has occurred.

Figure 3:
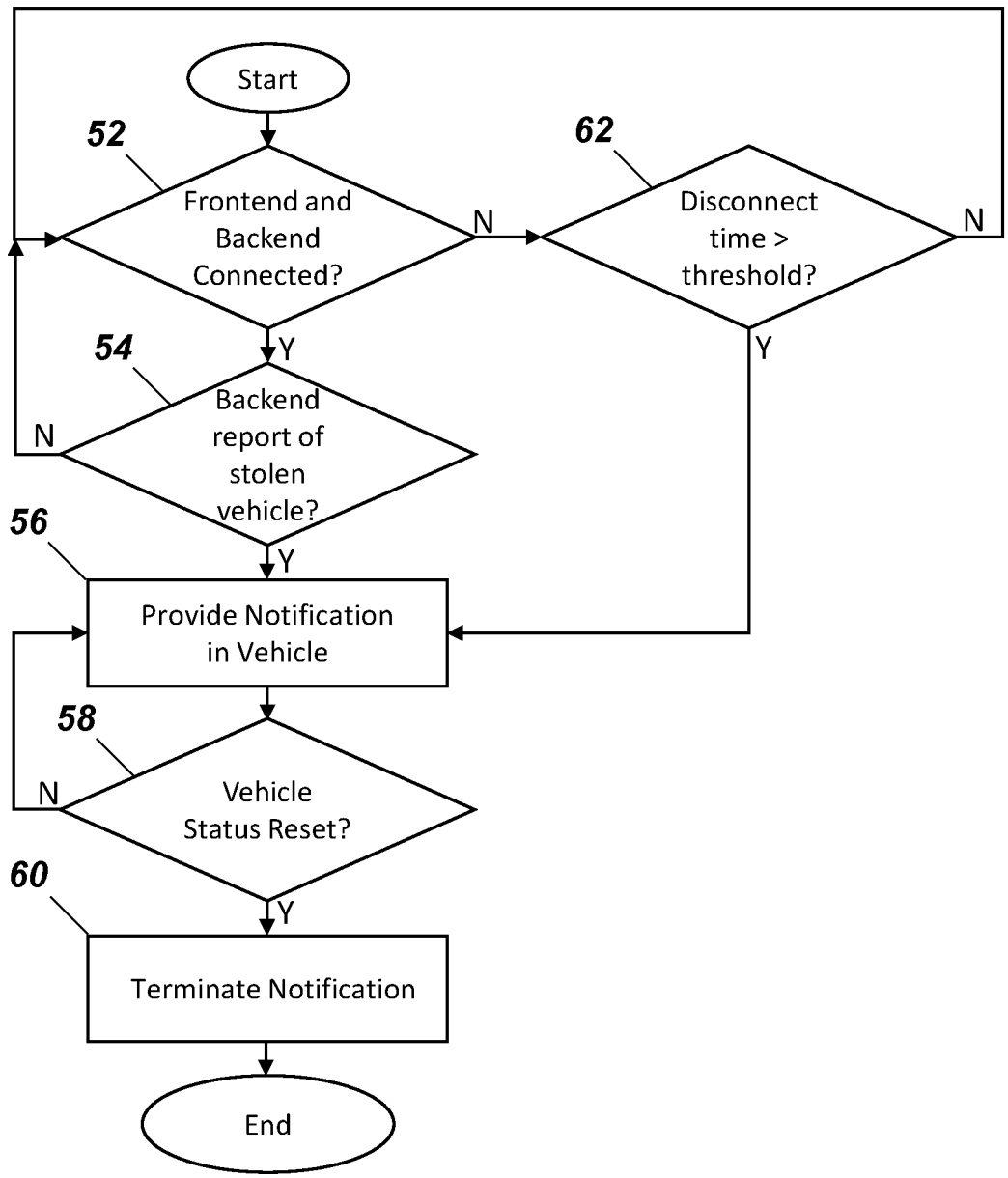
FIG. 3 is a flow chart for a method of displaying vehicle identification information in a suspected stolen vehicle.

Referring in more detail to FIG. 3, a flowchart for a method 50 for communicating vehicle identification information in a suspected stolen vehicle is shown. The method may generally include determining an occurrence of a stolen vehicle event and providing a corresponding notification in a vehicle, wherein the notification includes at least one vehicle identifier. The method may include more or fewer steps and may be implemented in different ways.

To determine whether a stolen vehicle event has occurred, multiple steps may be executed. In step 52, it is determined if the frontend 32 of the network 28 is connected to the backend 30 of the network 28. If the frontend 32 and backend 30 of the network 28 are connected, the backend 30 of the network 28 may both transmit to and receive signals from the frontend 32 of the network 28 located with the vehicle, and vice versa.

If the frontend 32 and backend 30 of the network 28 are connected, step 54 involves determining if the backend 30 of the network 28 has indicated occurrence of a stolen vehicle event. The frontend 32 may ping the backend 30 requesting whether a stolen vehicle event has occurred. Alternatively, the backend 30 may initiate communication with the frontend 32 by sending a signal indicating whether a stolen vehicle event has occurred.

If a stolen vehicle event has occurred, then the method proceeds to step 56 in which a notification is provided in the vehicle to alert an occupant of the stolen vehicle event and that the vehicle status is registered or set as stolen. The notification may provide at least one vehicle identifier to one or more of the indicators 27, where, as noted herein, the vehicle identifier(s) may be any information that can be used to identify a particular vehicle. The notification may be provided through any method sufficient to communicate information to a vehicle occupant. In at least some implementations, the notification may be provided through one or more displays 26 positioned to be visible from within the interior of the vehicle 12. Other methods may be used to communicate information to a user including but not limited to an audio device, a vibrating device, or others known in the field. If a stolen vehicle event has not occurred, the method may end or return to step 52 to again check the connection between the frontend 32 and backend 30, at any desired interval(s).

In at least some implementations, the notification may be intended to communicate to a user of the vehicle that a stolen vehicle event has occurred. This may be useful in recovering a stolen vehicle or in proving that a thief knew or should have known he or she was operating a potentially stolen vehicle. For example, the VIN may be used to register a vehicle with a government agency, track a vehicle's service history or to identify a stolen vehicle. On most vehicles, the VIN is located on the front left side of a vehicle under the windshield and on various other components. Thus, the VIN may be susceptible to tampering, such that the VIN may be altered or entirely changed. Thieves may exploit this in the secondary market by misrepresenting stolen vehicles with tampered VINs as clean-titled, not stolen vehicles. Therefore, the notification provided and maintained within the vehicle may be an active deterrent for someone operating a vehicle that is suspected to be stolen by indicating to the user the vehicle status or a vehicle identifier, or may be a passive deterrent for vehicle theft by providing evidence of an alleged thief's culpability.

In step 58 it is determined whether the vehicle status has been reset in the backend portion 30 to show that the vehicle is not stolen. If a stolen vehicle event has occurred and the notification has been provided, but the vehicle is subsequently reported by the backend 30 or frontend 32 of the network 28 as not stolen, the notification is terminated and the vehicle status is reset in the backend 30 of the network 28, in step 60.

In some implementations, the frontend 32 of the network 28 may ping the backend 30 to determine if the stolen vehicle event has been reset. The stolen vehicle event can be reset by an administrator of the network 28 if the vehicle is determined to be possessed by the vehicle owner and not stolen such that when the backend 30 of the network 28 is in communication with the frontend 32, the backend 30 may communicate the updated vehicle status to the frontend 32. In other implementations, the stolen vehicle event can be reset at the frontend 32 of the network 28 by an authorized entity such as but not limited to a dealership technician, law enforcement agent, or the vehicle's manufacturer. The authorized entity may utilize hardware and/or software designed to communicate with the frontend 32 of the network 28 to reset the stolen vehicle event. Once the frontend 32 is reset by an authorized entity, the reset may be communicated to the backend 30. If a stolen vehicle event has not been reset, the method may return to step 56 to maintain the notification of the stolen vehicle status and may then return to step 58 at any desired interval(s) to again check if the vehicle status has been reset.

Removing or stopping the notification in step 60 may include ending communication of a vehicle identifier to any or all indicator(s) 27. In at least some implementations, this includes removing a notification from displays 26 that are visible from within the vehicle, stopping the playing of an audio notification within the vehicle, stopping vibrations within the vehicle, or stopping/removing other methods of communicating with a vehicle occupant. After the notification is stopped or removed, the method may end or restart from the beginning, as desired.

If in step 52 it is determined that the frontend 32 of the network 28 is not connected to the backend 30 of the network 28, then the method proceeds to step 62 in which it is determined if the backend 30 and frontend 32 have been disconnected for longer than a predetermined, threshold amount of time. In some implementations, this can be determined by utilizing a timer or other device capable of keeping time. After the threshold amount of time passes without reconnection of the frontend 32 and backend 30 of the network 28, in at least some implementations, the system determines that a stolen vehicle event has occurred even without a stolen vehicle event being reported at or via the backend 30 of the network 28.

This may be done to inhibit a thief from tampering with the frontend 32 systems to prevent communication of the vehicle with the backend 30 of the network 28. For example, a thief may disconnect a vehicle antenna (e.g. a cellular network and/or GPS system antenna) via which the frontend 32 communicates with the backend 30, to avoid the backend 30 from being able to communicate with the vehicle and to inhibit locating of the vehicle (e.g. by preventing cellular tower triangulation location methods, or GPS location). Thus, even if a thief disconnects the vehicle from the backend 30 of the network, the system can still provide a notification of a stolen vehicle event. If the disconnection happened for a legitimate reason, like failure of some frontend 32 component without tampering by a thief, then the stolen vehicle notification may provide notice to a vehicle occupant/owner that the vehicle is disconnected from the backend 30 and the occupant can seek to correct the problem that caused the disconnection. In this regard, the threshold time may be of sufficient duration to prevent a notification from being provided in the vehicle after shorter periods of time in which the vehicle loses connection with the backend 30 because of a temporary condition, for example, an outage of a communication network or system between the frontend 32 and backend 30 of the network 28 (e.g. cellular outage) or when the vehicle is outside of the coverage area of the backend 30 of the network 28. In at least some implementations, the threshold time may be between 1 day and 5 days, but of course, other thresholds may be used, as desired.

If in step 62 it is determined that the frontend 32 of the network 28 has been disconnected from the backend 30 of the network 28 for greater than the threshold amount of time, the method proceeds to step 56 in which a notification is provided in the vehicle, as described above. After the notification has been provided in step 56, steps 58 and 60 may be executed to determine if the stolen vehicle event has been reset and if the notification should be stopped or removed, as described above.

What is claimed is:

1. A method of displaying vehicle identification information in a suspected stolen vehicle, comprising the steps of:
   determining either that: 1) a frontend of a network has not been connected to a backend of the network for a predetermined amount of time; or 2) the vehicle has been reported as stolen; and
   displaying a notification on a display within the vehicle, wherein the notification includes at least a vehicle identifier, wherein the frontend of the network repeatedly attempts to connect to the backend of the network at a predetermined time interval.

2. The method of claim 1, wherein if the frontend of the network has not been connected to the backend of the network for the predetermined amount of time and thereafter the frontend of the network connects to the backend of the network, the backend of the network communicates to the frontend of the network whether the vehicle has been reported as stolen.

3. The method of claim 2, wherein if the vehicle has not been reported as stolen, displaying of the notification is terminated.

4. The method of claim 1, wherein the vehicle identifier includes at least a vehicle identification number.

5. The method of claim 1, wherein if the vehicle has been reported as stolen and the notification has been displayed, but the vehicle is subsequently reported by the backend of the network or the frontend of the network as not stolen, displaying of the notification is terminated.

6. The method of claim 1 wherein the frontend of the network is communicated with the backend of the network via a cellular communication network.

7. The method of claim 1 wherein the vehicle identifier includes at least one of a vehicle identification number, a make of the vehicle, a model of the vehicle, a year of manufacture of the vehicle and a color of the vehicle.

8. The method of claim 1 wherein the notification is stored in memory of the vehicle and the notification is displayed when the frontend of the network has not been connected to the backend of the network for a predetermined amount of time.

9. The method of claim 1 wherein the notification is transmitted from the backend of the network to the frontend of the network after the vehicle has been reported as stolen.

10. A method of communicating vehicle identification information in a suspected stolen vehicle, comprising the steps of:
   determining an occurrence of a stolen vehicle event;
   providing a notification in the vehicle, wherein the notification includes at least one vehicle identifier, wherein the step of determining an occurrence of a stolen vehicle event includes determining if a frontend of a network is connected to a backend of a network, and wherein determining if the frontend of the network is connected to the backend of the network includes determining if the frontend of the network has not been connected to the backend of the network for a predetermined amount of time, and if the frontend of the network has not connected to the backend of the network for the predetermined amount of time, then it is determined that a stolen vehicle event has occurred.

11. The method of claim 10, wherein the step of determining an occurrence of a stolen vehicle event is accomplished by the frontend of the network receiving a communication from the backend of the network.

12. The method of claim 10, wherein if the frontend of the network is connected to the backend of the network and the backend of the network does not indicate that a stolen vehicle event has occurred, a notification is not provided in the vehicle.

13. The method of claim 10, wherein the vehicle identifier includes at least the vehicle identification number.

14. The method of claim 10, wherein the notification is provided on a display that is visible from at least an interior of the vehicle.

15. The method of claim 10, wherein the notification provided in the vehicle includes a communication that a stolen vehicle event has occurred.

16. The method of claim 10, wherein if a stolen vehicle event has occurred and the notification has been provided, but the vehicle is subsequently reported by the backend of the network or the frontend of the network as not stolen, the notification is removed.

* * * * *